(12) United States Patent
Zosel

(10) Patent No.: US 6,199,870 B1
(45) Date of Patent: Mar. 13, 2001

(54) SEAL

(75) Inventor: Dietrich Zosel, Dueren (DE)

(73) Assignee: Friatec Aktiengesellschaft, Mannheim (DE)

( * ) Notice: Subject to any disclaimer, the term of this patent is extended or adjusted under 35 U.S.C. 154(b) by 0 days.

(21) Appl. No.: 09/331,391

(22) PCT Filed: Dec. 18, 1997

(86) PCT No.: PCT/EP97/07102

§ 371 Date: Jun. 21, 1999

§ 102(e) Date: Jun. 21, 1999

(87) PCT Pub. No.: WO98/30821

PCT Pub. Date: Jul. 16, 1998

(30) Foreign Application Priority Data

Dec. 20, 1996 (DE) ............................................. 196 53 456

(51) Int. Cl.⁷ ..................................................... F16L 5/02
(52) U.S. Cl. ........................... 277/605; 277/626; 277/646; 277/634; 251/61; 251/175; 251/328
(58) Field of Search .................................. 277/605, 626, 277/646, 634; 251/175, 328, 326, 335.2, 61, 61.1, 195

(56) References Cited

U.S. PATENT DOCUMENTS

| 1,476,344 | * | 12/1923 | McGee . |
| 3,596,874 | * | 8/1971 | Di Santo ............................ 251/175 |
| 4,262,878 | * | 4/1981 | O'ffill .................................. 251/175 |
| 4,292,992 | * | 10/1981 | Bhide .................................... 137/340 |
| 4,522,223 | * | 6/1985 | Balsys et al. ........................ 137/240 |
| 4,593,727 | * | 6/1986 | Ulveling ................................. 141/5 |
| 5,143,348 | * | 9/1992 | Bader et al. ......................... 251/158 |
| 5,941,505 | * | 8/1999 | Nagel ................................ 251/335.2 |

FOREIGN PATENT DOCUMENTS

| 1295172 | * | 10/1962 | (FR) . |
| 851732 | * | 10/1960 | (GB) . |
| 2152195 | * | 10/1984 | (GB) . |
| 9529356 | * | 11/1995 | (WO) . |

* cited by examiner

*Primary Examiner*—Anthony Knight
*Assistant Examiner*—Alison K. Pickard
(74) *Attorney, Agent, or Firm*—Evenson, McKeown, Edwards & Lenahan, P.L.L.C.

(57) ABSTRACT

A seal for a shut-off device moved in a rectilinear manner, which is switched from a closed to an open position and vice versa so as to shut off material flows. The seal is formed of metallic components which define a pressure chamber to which external pressure can be applied to achieve seal tightness. Employing only metallic components makes it possible to use the seal in a wide temperature range and under conditions of exceptional wear caused by either frequent actuation or the composition of the flowing medium. The sealing system includes a shut-off device (1) against which a movable seat (5) forms a seal. The seat is connected to the tubular casing (2) in a pressure tight manner, and the casing in turn is connected to a flange (3). The assembly is connected to a housing (8) by a flange (6) and is sealed by seal (7). Membranes (9, 10) and support plate (14) form a pressure chamber (11) to which pressure $P_s$ is applied through connecting nipple (13) and bores (12). Pressure $P_b$ acts in pressurized space (69), and pressure $P_g$ in pressurized space (70). The pressure duct inside casing (2) between connecting nipple (13) and bores (12) is formed by plate (15) which is connected to the casing in a pressure tight manner. Membrane (9) has a wear-resistant coating where it contacts the shut-off member (1). Support plate (14) constitutes a radial guide for membranes (9, 10) to prevent plastic deformation due to frictional forces during actuation, and it axially limits displacement during changes in direction of the pressure when the shut-off device is closed. When no pressure $P_s$ is applied to membrane (9), it rests flat against the annular surface of support plate (14), so the surface pressure against shut-off member (1) is reduced and the membrane is not at risk of permanent deformation as the shut-off member is actuated.

36 Claims, 10 Drawing Sheets

SEAL

BACKGROUND OF THE INVENTION

The invention relates to a seal for a shut-off member for translatory movement which is moved from a closed position to an open position or in the opposite direction, in order to shut off flows of a substance.

The seal comprises metal components which define a pressure chamber to which external pressure can be applied in order to prevent leakage. The exclusive use of metal components permits use for wide temperature ranges and extraordinarily wearing conditions caused by frequency of operation of the valve or the composition of the working medium.

For the operation of such a seal it is important that the leakage resistance of the fitting be achieved between the casing and the shut-off member by means of two sealing seats disposed in the casing. When there is pressure difference in a particular direction, a fixed sealing seat on the side facing away from the pressure difference is necessary. The side facing the pressure difference must be given an axially movable seal seat that is able to equalize even deformations of the casing by internal pressure and/or external stress. Mechanical point stresses from positions outside of the casing necessitate a rigidity of the movable seat ring directly proportional to the distance between these points of application of force, the seat ring being no longer able to compensate for deformations of the shut-off member and casing. Thus, the overall system is not assured against leakage in every state of operation. To achieve the basic requirement of allowing no components of the medium to get into the housing whether the fitting is in the closed or open position, a pressure can be applied within the casing by means of a blocking medium. The result is that, in the event of leakage, only components of the blocking medium can enter the working medium and the shut-off for manual work downstream is secure.

Basically, sealing systems are known which utilize expandable sealing elements in order to produce sufficient surface pressure on the shut-off member. Tubular sealing elements of resilient synthetic resin materials are usable only to a limited extent on account of temperature limits and poor resistance to wear. Particularly in the case of advanced wear, such sealing elements tend to stick in the gap they are sealing. Therefore either the expandability of the sealing element or the possibility of operating the valve is lost.

Known metal sealing systems for providing axial flexibility have the disadvantage that hybrid solutions are involved, of a combination of metal surrounding the pressure chamber that is to be expanded externally and the transmission of the force thereby produced to resilient sealing elements made of elastomers. The disadvantages described above are again encountered. The pressure chambers are defined, for reasons of elastic deformability, by a plurality of parallel membranes whose seal against one another cannot be tested either during manufacture or in operation. The multilayer character of the elastic membrane is necessary because it must have the ability to deform even at the maximum working temperature. As for the function of sealing the pressure chamber, the failure of a single membrane leads to a general failure. It is extremely difficult to use forming processes to manufacture a pack of membranes to accommodate the elastic sealing ring, especially to make them of approximately equal radial thickness. The retention of the elastic sealing ring in the membrane pack is inadequate, so that wear of the elastic sealing ring differs according to its circumferential position in relation to the direction of the translatory movement of the shut-off member.

SUMMARY OF THE INVENTION

The object of the present invention is to provide a seal of the kind referred to above, which with relatively little expense achieves a sealing action and rate of wear that is uniform regardless of circumferential position, even if the working medium applies high temperatures and high pressures to the shut-off member and distortions of the shut-off member and/or external elements of the entire system occur, high frequencies of operation of the valve are to be expected, and intensified wear due to solid components of the medium is possible.

This object is achieved by the invention as described hereinafter. To understand the operation it is necessary to consider the pressure conditions in three different pressure chambers. When the valve is in the closed state, these are: the working pressure $P_b$ to be blocked off between the shut-off member and the connecting flange of the valve, the pressure within the casing $P_g$, and the actuating pressure within the elastic seat $P_s$ for the production of a surface pressure on the shut-off member. All embodiments of the present invention use differing surfaces subjected to the pressure $P_s$ in a direction perpendicular to the direction of actuation of the shut-off member. For that purpose two membranes, optimized with regard to required deformability, are necessary, which are connected to the case in a pressure-tight manner, and are arranged substantially parallel to the shut-off member. This annular surface difference is sufficient of itself not only to close any space between the seat and the shut-off member, but also to produce the necessary surface pressure. At the same time the pressure $P_s$ can also remain below the pressure $P_b$ because the resultant force is applied to a very small contact surface of the seat. It is thereby as if it were transformed. It is thus possible to produce great surface pressures on the seat with relatively low pressure $P_s$. This is also necessary, since the seal is to be exclusively metallic between the flexible seat and the shut-off member. Basically two different approaches to the solution are possible. For the first one, a membrane system can be used which, by means of the pressure $P_s$, itself produces the contact with the shut-off member. For the second, the axial deformability of the membranes can be transferred to a relatively rigid seat body which then produces the contact with the shut-off member with a contact area which is independent of the pressure $P_s$.

The first solution requires a wear-resistant coating on the entire radius of the membrane which faces the shut-off member. The line of contact between the membrane and the shut-off member is more thickly coated and raised. This configuration has the advantage of equalizing all process-related deformations of the components of the valve. The necessary stiffness, especially of the casing and of the shut-off member, and the requirements as to the departures of the sealing surfaces from the planar, can be reduced. This also affects the machining processes for the final working of the components of the valve which relate to the seal.

The second solution has the advantage of providing the membranes with less sensitivity to wear due to translatory movements of the shut-off member. However, two shaped membranes must be used.

Both configurations can be used with blocking gas pressure $P_b$ within the housing. However, the sealing effect is strengthened only if the average seal diameter is greater than the inside diameter of the membrane facing away from the shut-off member. If these two sizes are equal, then the surface pressure on the seat can be affected only by the pressure PS This opens up the possibility of minimizing wear during the opening or closing of the valve.

An additional embodiment contains an indirectly proportional ratio of the pressure $P_s$ to the surface pressure on the seat. This means that the seat pressure is produced only by bias at the time of installation and the working pressure $P_b$, and before actuation of the valve, the pressure $P_s$ is increased in order to reduce the surface pressure on the seat and the wear. The retraction of the free area is slight.

In the case of fluctuating pressure direction, a design employing axially movable seats on both sides of the shut-off member is possible.

The production of the pressure $P_s$ and its partial or complete reduction during actuation of the valve is a basic requirement for the virtually wear-free operation of the seal. At the same time contact of the components to be sealed is maintained during operation in order to minimize the penetration of solids into the seal area.

Three possibilities are described below, which satisfy this basic requirement. The first is the direct proportional derivation of the pressure $P_s$ from the pressure $P_b$ or $P_g$. Production from the pressure $P_b$ may require an intermediate container or a filter of equal value for cleaning out components of the working medium that are harmful to the operation of a pneumatic or hydraulic cylinder. The conversion of the pressure $P_b$ to a higher pressure at a constant ratio is performed by means of a pressure converter. The suspension of this pressure production during actuation is achieved through a force acting directly opposite, whose effectiveness is controlled by a mechanical connection with the part of the valve that transmits the driving force.

Another embodiment of the production of the pressure $P_s$ is transmitted by a mechanism configured similarly to the first solution, but generated by an inert outside medium.

The third solution utilizes a direct, constant production of pressure by a predetermined force and the elimination thereof during all positions of the shut-off member which are not end positions of its operation.

In the design of the pressure chambers which are surrounded by the flexible seals, special emphasis has been placed on their minimal volumes, so as not to be too narrowly limited in the selection of the media for the transmission of the pressure $P_s$.

BRIEF DESCRIPTION OF THE DRAWINGS

Several embodiments of a seal according to the invention will be explained below with reference to the appended drawings which show in FIG. 1 membrane system in the axially fully pressed position FIG. 2 a membrane system in the axially fully relieved position FIG. 3 a membrane system in the axially fully pressed position with pressure assistance $P_b$ FIG. 4 a membrane system in the axially fully relieved position with pressure assistance $P_b$ FIG. 5 a membrane system with massive seat and membranes of similar shape FIG. 6 a membrane system with massive seat and differing membranes FIG. 7 a membrane system with opposite action FIG. 8 an overall view of a valve actuated by translatory movement FIG. 9 proportional production of pressure from the working pressure FIG. 10 semiproportional production of pressure with an outside medium FIG. 11 constant pressure production with an outside medium

DETAILED DESCRIPTION OF PREFERRED EMBODIMENTS

Figure 1:
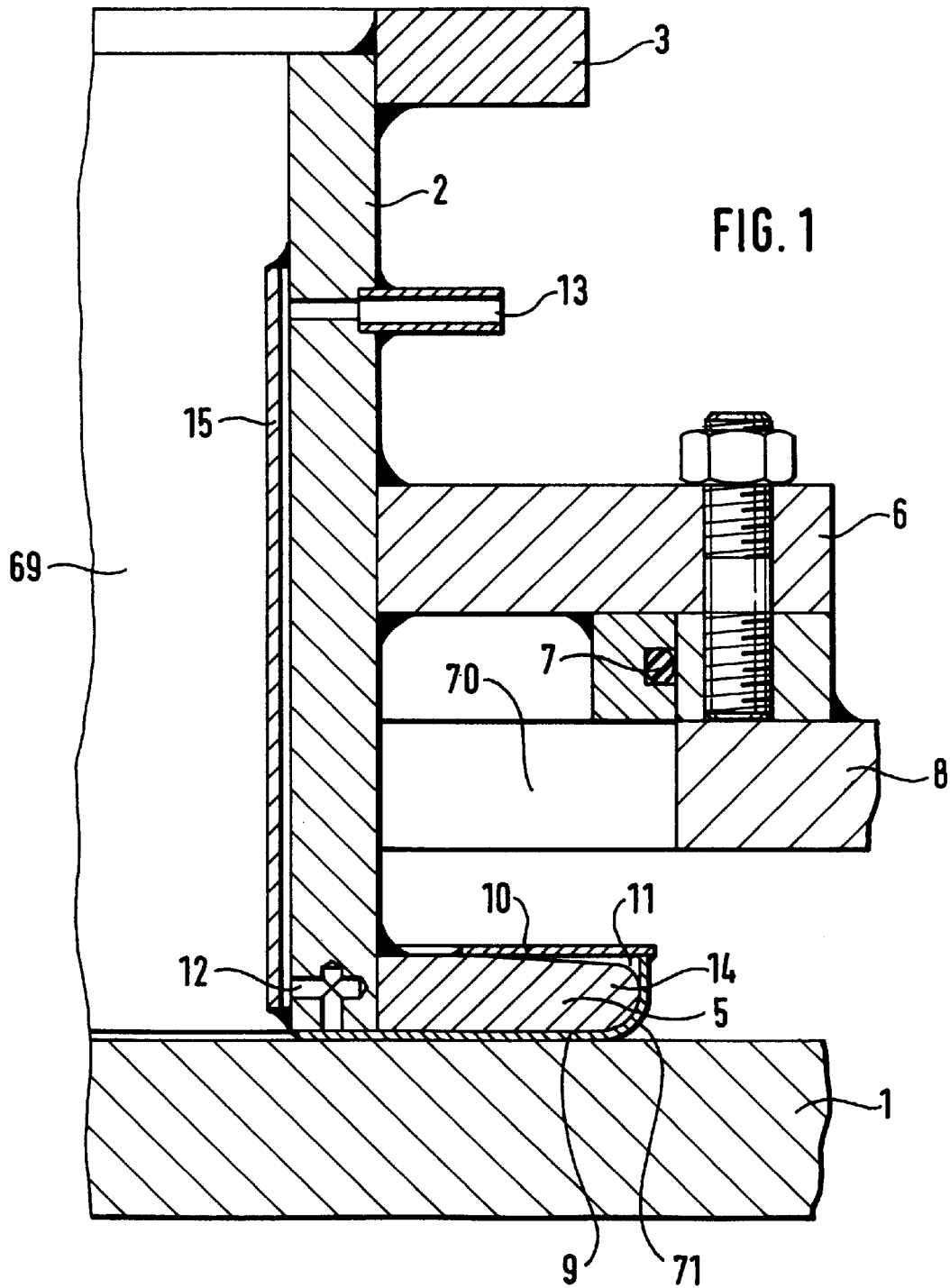

FIG. 1 shows a sealing system with the shut-off member 1 against which the movable seat 5 makes the seal. The seat is connected in a pressure tight manner to the tubular casing 2 which in turn is connected to the flange 3. The entire assembly is joined to the housing 8 by the flange 6 and is statically sealed to one another with the seal 7. The membranes 9 and 10 form with the support plate 14 a pressure chamber 11 to which the pressure $P_s$ is applied through the bores 12 and the connecting nipple 13. The pressure $P_b$ acts in pressure chamber 69, and pressure $P_g$ acts in pressure chamber 70. The pressure passage between the bores 12 and the connecting nipple [13] is formed inside the tubular casing 2 by a metal sheet 15 which is connected in a pressure tight manner to the tubular casing 2. The membrane 9 has a wear-resistant coating along the contact surface with the shut-off member 1. The support plate 14 has a dual function. For one thing it constitutes the radial guiding means for the membranes 9 and 10 in order to prevent plastic deformation by friction when the device is actuated. The second function is that of an axial limitation of the displacement when the direction of pressure changes while the shut-off member is closed. The membrane 9 lies on the entire annular surface of the supporting plate 14 and due to the reduction of the surface pressure it is no longer exposed to the danger of permanent deformations due to low bias in the installed state without the influence of the pressure $P_s$.

Figure 2:
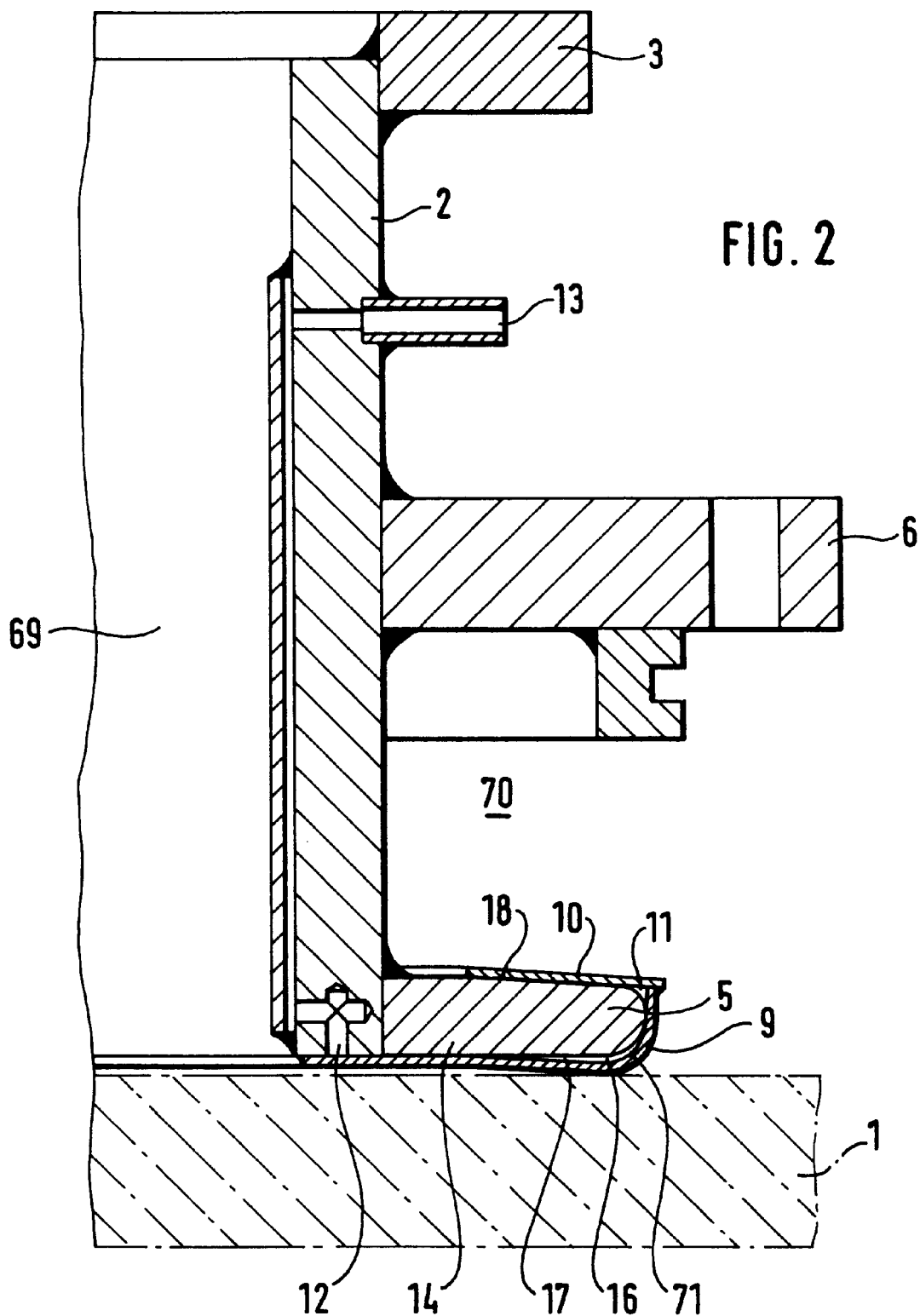

FIG. 2 shows the maximum deflection of the membranes 9 and 10 when the configuration of FIG. 1 is in the unloaded state. A space 16 can be seen therein which corresponds to the maximum axial deflection of membrane 9 in conjunction with membrane 10. When the pressure $P_s$ is applied to the two annular surfaces 17 and 18, the resultant force is used exclusively for producing the sealing pressure. The bias of the membranes toward the shut-off member 1 increases the radius of the line of contact between membrane 9 and shut-off member 1. It reaches its maximum when the membrane 9 lies on the support plate 14 (FIG. 1). The configurations of FIG. 1 and FIG. 2 vary their available surface pressure between the membrane 9 and the shut-off member 1 and the applied pressure $P_s$ with the variation of the pressure $P_b$, provided that the inside diameter of membrane 10 is smaller than the average seal diameter. If the pressure $P_g$ is greater than the pressure $P_s$ the sealing action is improved.

Figure 3:
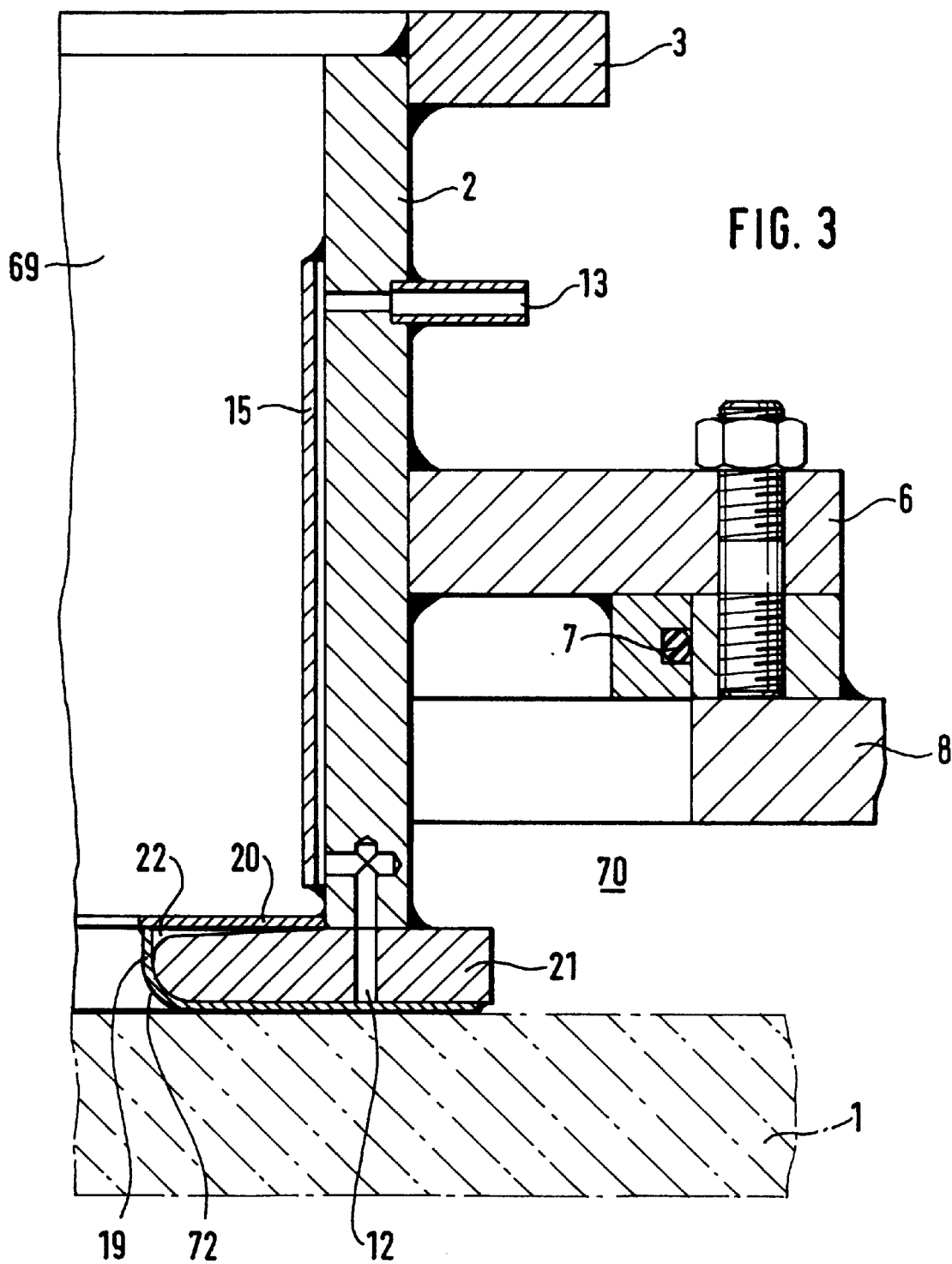
Figure 4:
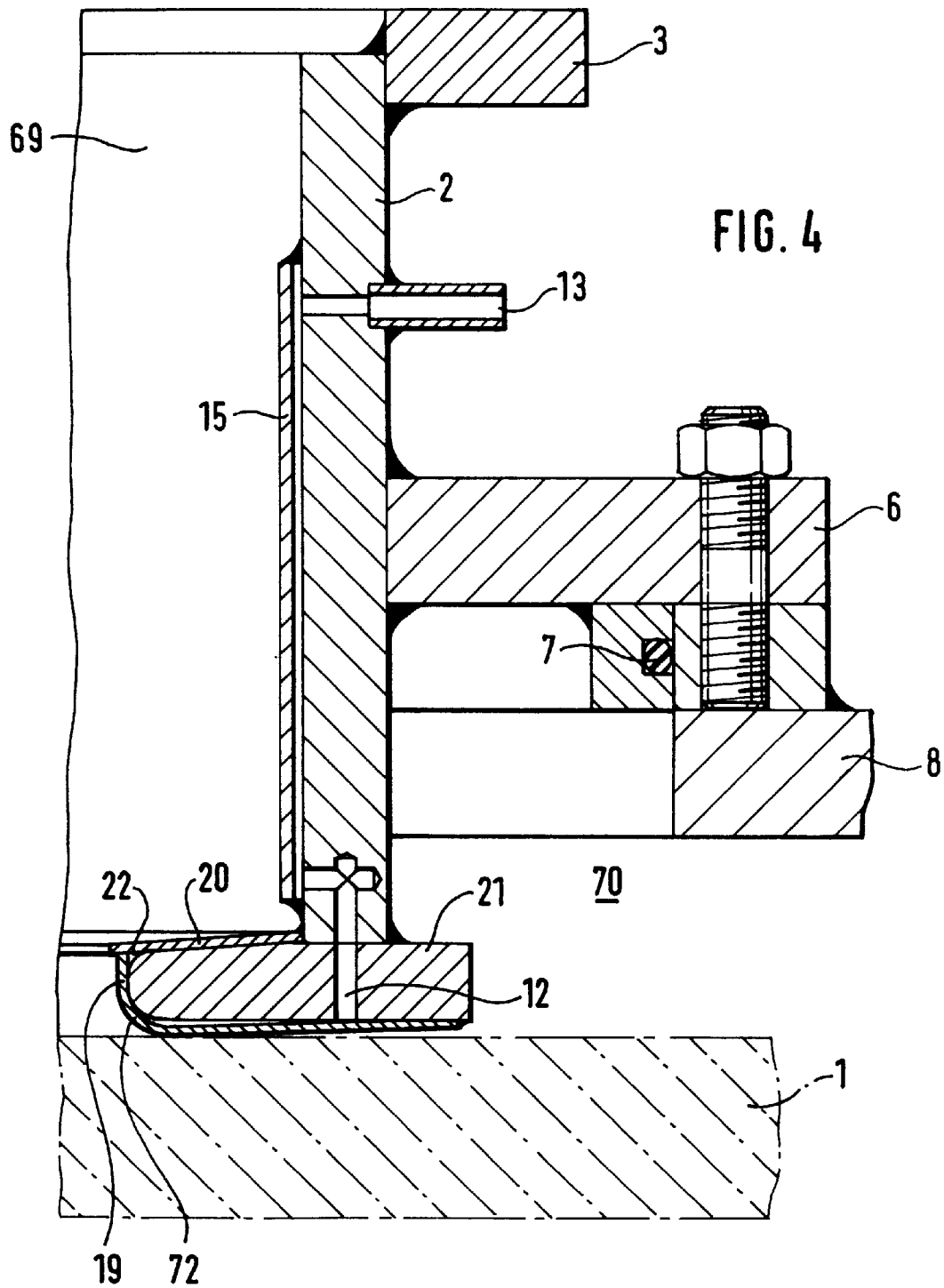

FIGS. 3 and 4 show an embodiment of the membrane system composed of the membranes 19 and 20, which operates with sealing action improved by the working pressure $P_b$. Only the minimum surface pressure between membrane 19 and the shut-off member 1 needs to be produced by the application of the pressure $P_s$. Increases of the working pressure $P_b$ result in a proportional increase of the sealing surface pressure. The average seal diameter is to be made as great as possible by the configuration of the membrane 19, so that at pressures $P_g$ within the housing 8 above the working pressure $P_b$, no lifting away of the membrane 19 from the shut-off member will occur. The pressure $P_s$ in the pressure chamber 22, which is formed by the membranes 19 and 20 and the support plate 21, is in any case to be selected higher than the maximum pressure $P_b$.

In FIG. 4 the membranes 19 and 20 are shown in the unloaded state. Here, again, the entire pressure difference between $P_s$ and $P_b$ can be used for producing the sealing action between membrane 19 and shut-off member 1.

Figure 5:
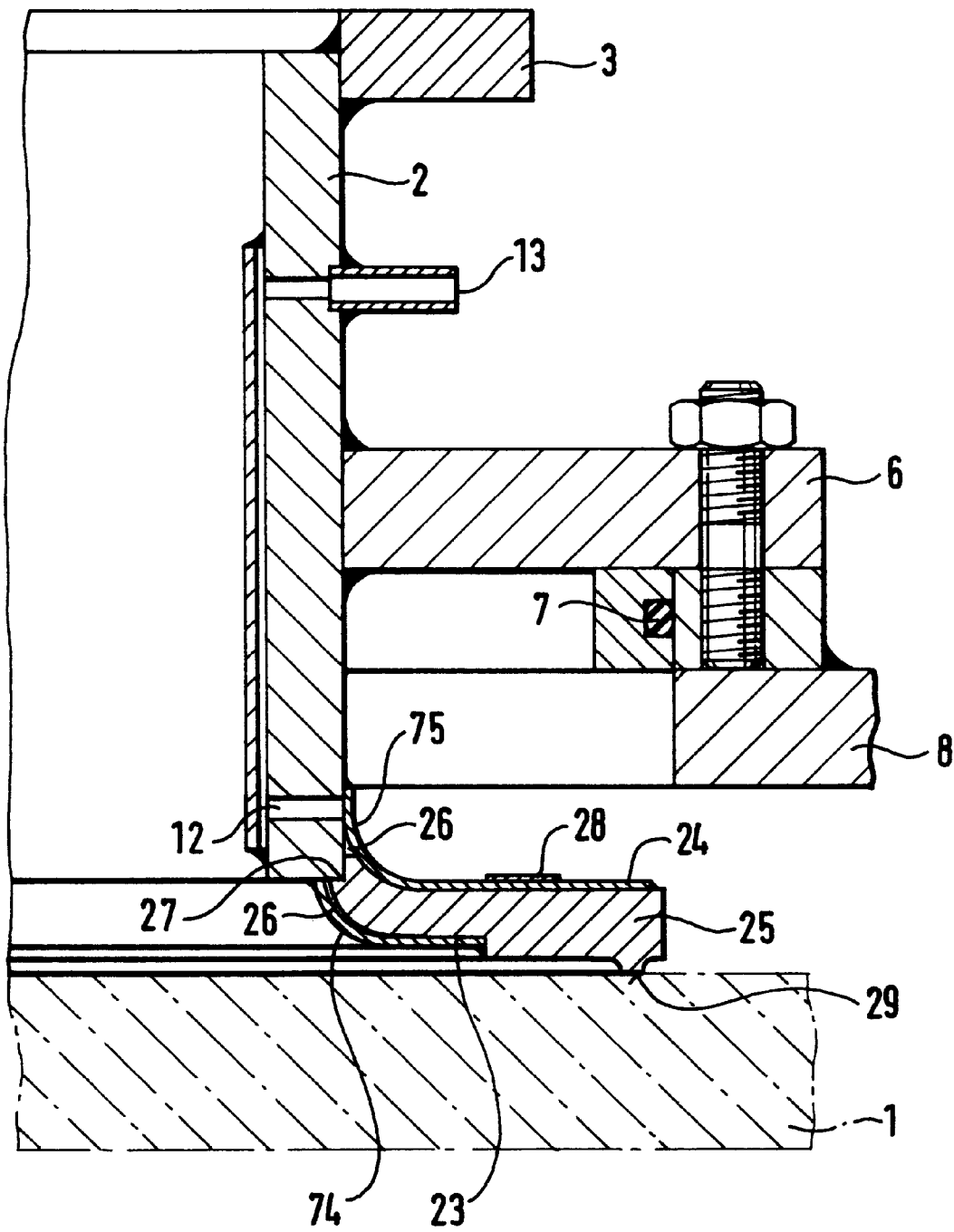

FIG. 5 shows a variant of FIG. 1. It is distinguished by a greater ability to deform axially in the direction of shut-off member 1. The pressure chamber 26 for the pressure $P_s$ is formed by the membranes 23 and 24 as well as by the support plate 25 and the tubular casing 2. To avoid stability problems in the membrane 24, it is equipped with a reinforcing plate 28 whose radial positioning prevents impermissible deformation by $P_s$. These problems can only occur, however, when there is a great pressure difference between $P_s$ and $P_b$. The support plate 25 is protected by an abutment 27 against unwanted deformation of membranes 23 and 24 toward flange 3 if the direction of the working pressure changes. The average sealing diameter of seat 29 is made close to the outside diameter of the membrane 24, so that any positive pressure difference between $P_g$ and $P_b$ has a seal-promoting effect.

Analogous to the relation between FIGS. 1 and 3, the configuration of FIG. 5 can also be disposed inside of the tubular casing 2 and thus the sealing action can be improved by the influence of the working pressure $P_b$.

Figure 6:
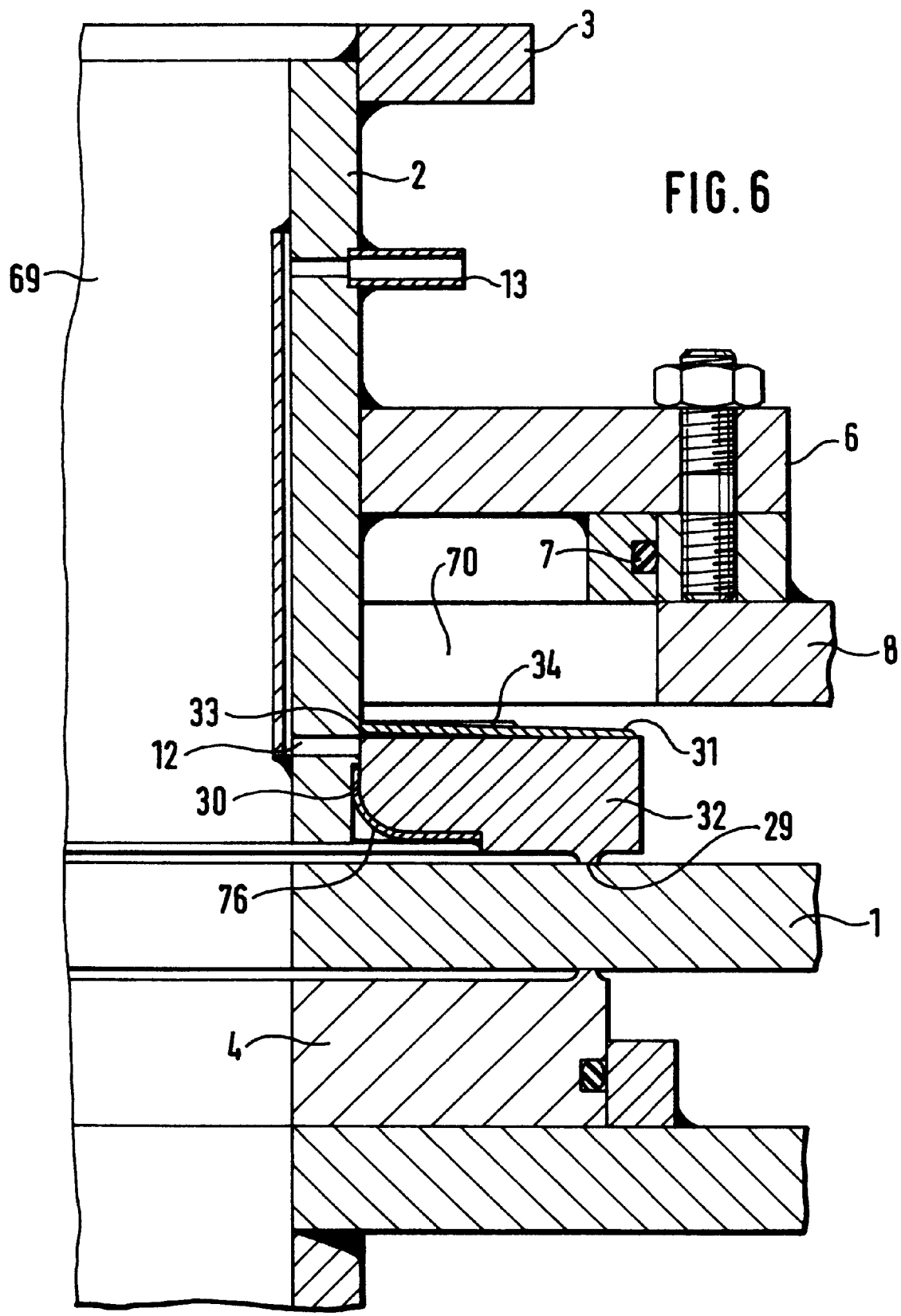

FIG. 6 shows a seal which defines a pressure chamber 33 in which the pressure $P_s$ is exerted. The pressure chamber 33 is formed by the membranes 30 and 31 as well as the seat plate 32 and the tubular casing 2. A reinforcing plate 34 is connected with the membrane 31 in order to prevent plastic deformation in case $P_g$ is greater than $P_s$. The two membranes 30 and 31 serve to limit displacement in the axial direction by being welded to the tubular casing 2.

Figure 7:
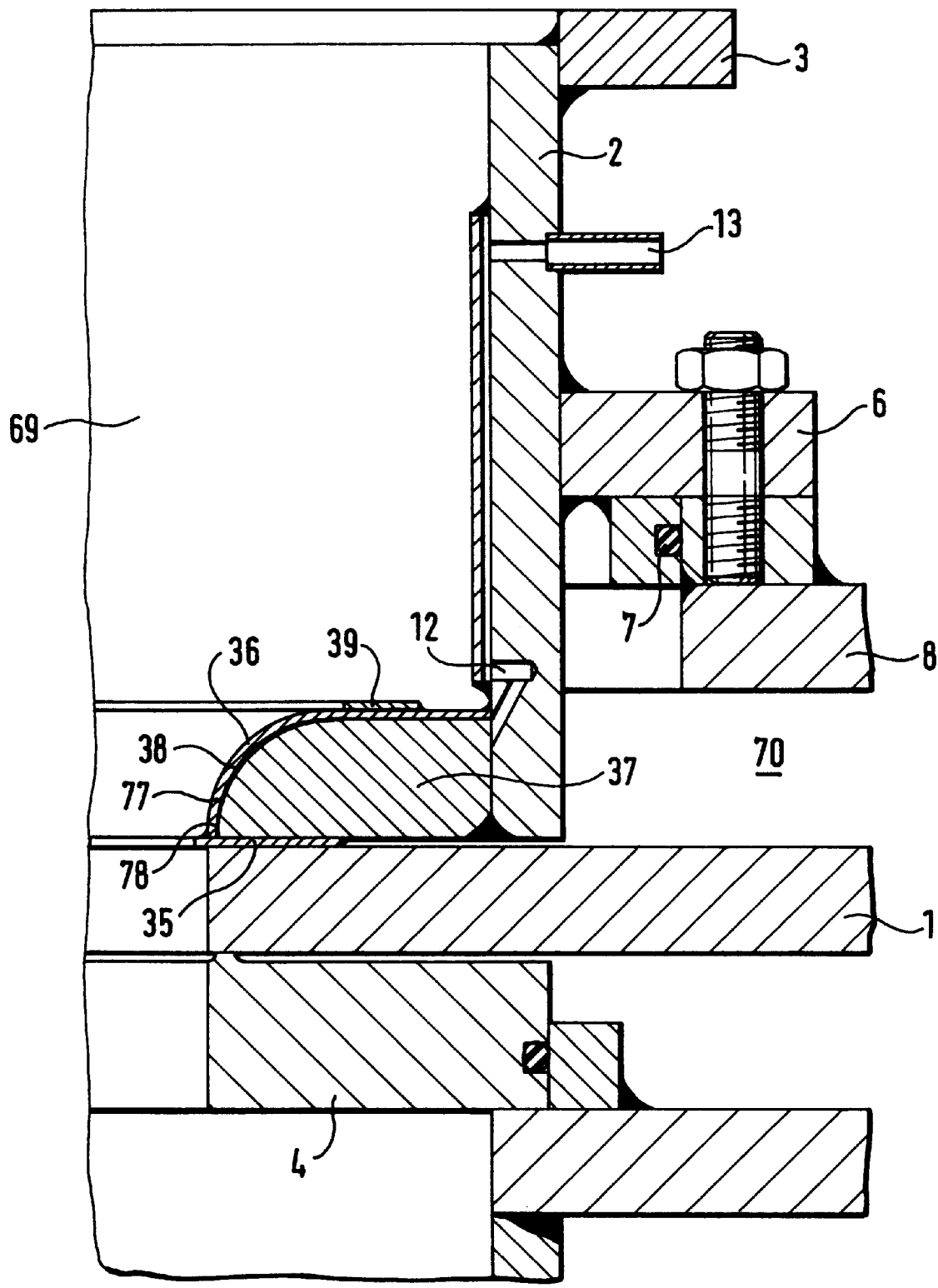

FIG. 7 is a variant of the embodiments of the invention thus far described, which permits a reduction of the surface pressure on the shut-off member 1 as pressure $P_s$ decreases. When the flexible seal is installed the membrane system receives from the membranes and from the shoe so much axial bias that the minimum surface pressure on the shut-off member 1 is attained. Beyond that, the working pressure $P_b$ will increase the sealing action proportionally. Upon actuation of the shut-off member 1, the pressure $P_s$ is applied in the pressure chamber 38, resulting in a reduction of the surface pressure between membrane 35 and shutoff member 1.

Figure 8:
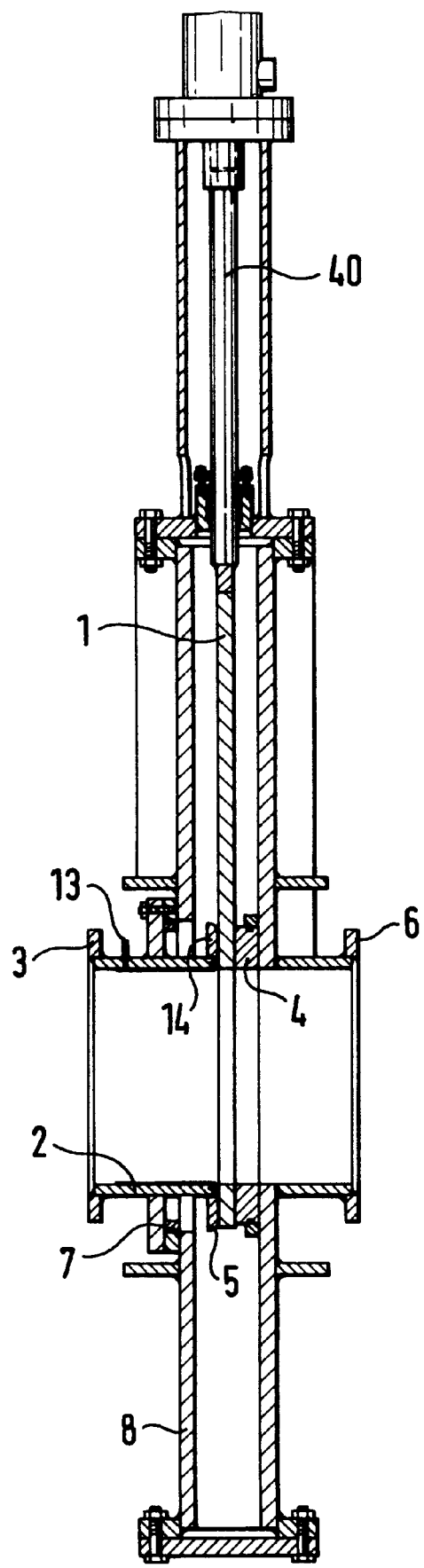

FIG. 8 shows an overall view of a translationally actuated gate valve with the rod 40 which transmits the driving force to the shut-off member.

Figure 9:
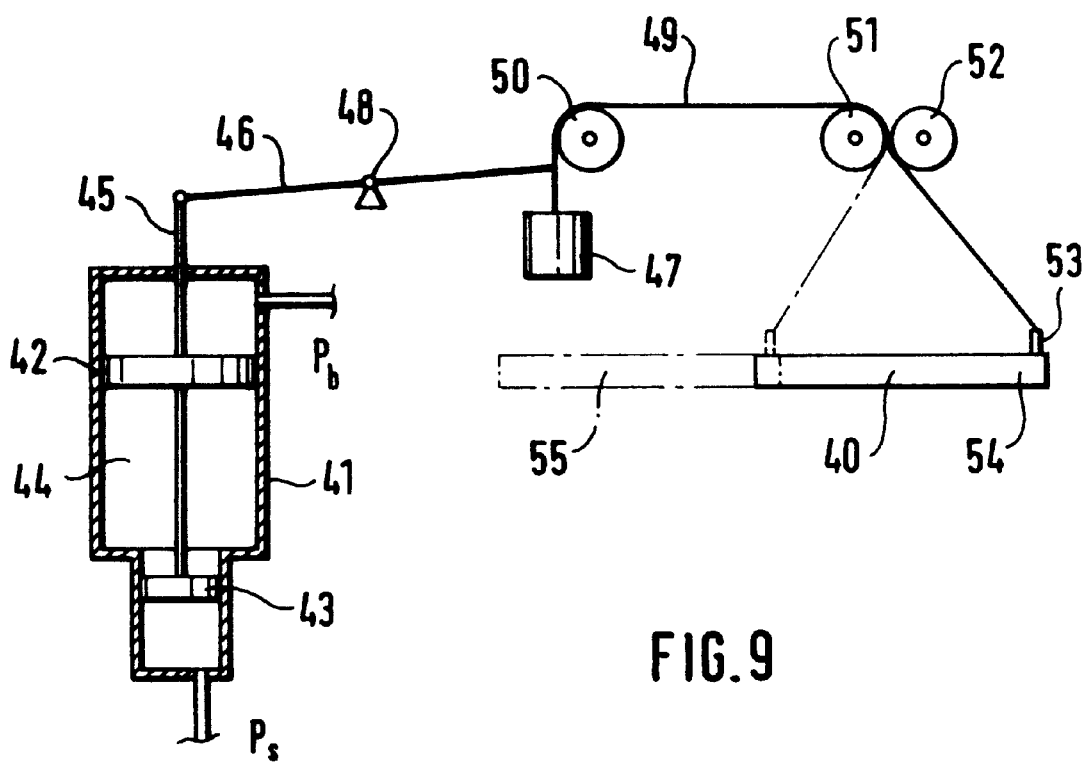
Figure 10:
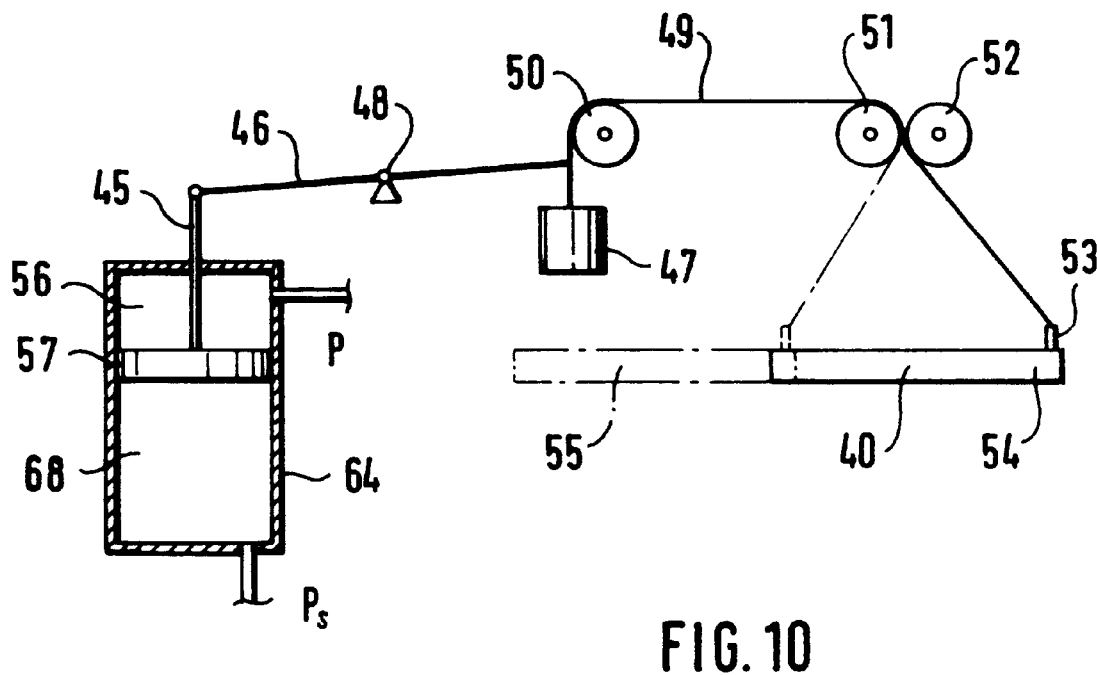
Figure 11:
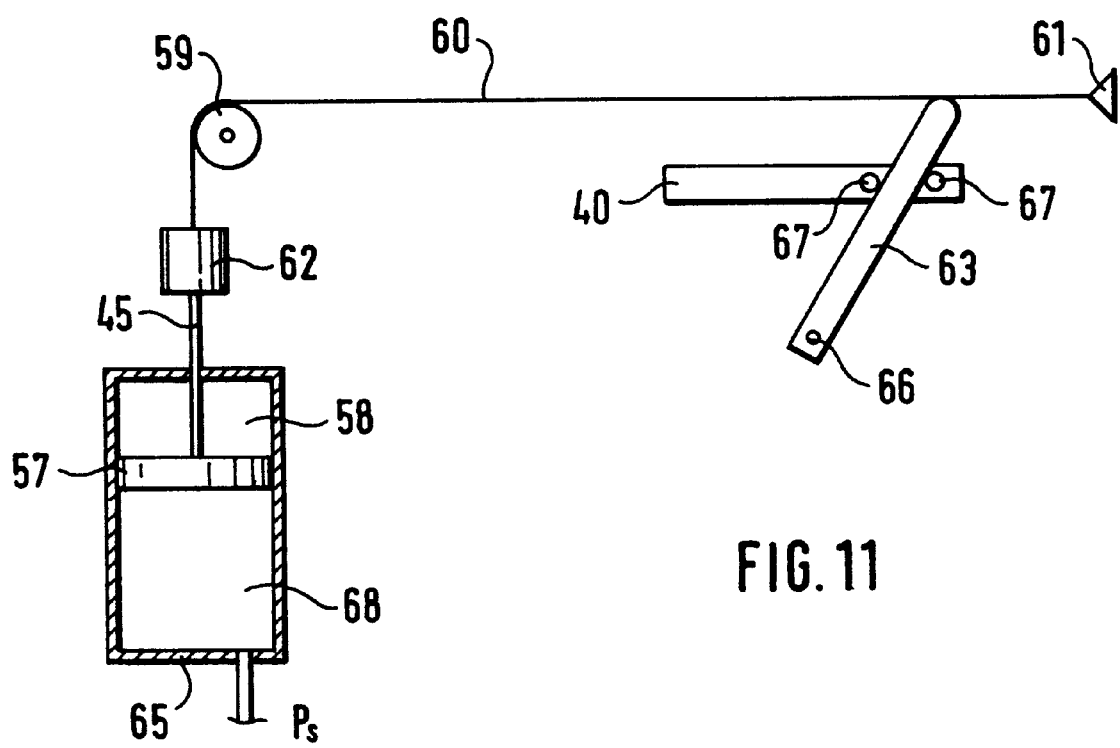

In FIGS. 9 to 11 are shown possibilities for the production and control of the pressure $P_s$ depending on the position of the rod 40. The pressure $P_s$ is supplied to the pressure connection nipple 13, while avoiding conduits of great length.

FIG. 9 shows a device for producing the pressure $P_s$ from the working pressure $P_b$. It is comprised of a double cylinder 41 with the piston 42, to which the pressure $P_b$ is applied, and the piston 43, which produces the pressure $P_s$. There is no pressure in the chamber 44 in any position of the pistons 42 and 43. Piston 42 is connected by its connecting rod to a lever 46. A weight 47 is attached to the lever 46. The lever 46 is pivotable about an axis 48. The rod 40 is connected via a fastening element 53 and a cable 49 to the lever 46 and is guided by rollers 50, 51 and 52. In the open position 54 and also in the closed position 55 of the rod 40 the weight 47 is lifted by the cable 49 and thus permits the transformation of pressure $P_b$ into pressure $P_s$. The beginning of the increase of the pressure to its end value is controlled by the length of the cable 49. In all other intermediate positions of the rod 40, the weight 47 acts to reduce the pressure $P_s$.

In FIG. 10 the pressure chamber 56 is filled with an outside medium to a pressure above the working pressure $P_b$ and is compressed analogous to the arrangement in FIG. 9 during the actuation of the valve by the possible lowering of the weight 47. This results in a reduction of the pressure $P_s$, since the piston 57 moves upward. Due to the coupling of piston 57 through lever 46 and cable 49, the effect of the weight 47 is removed as the rod 40 approaches its two end positions, the piston 57 is moved downward, and the pressure $P_s$ in the compression chamber 68 is increased.

FIG. 11 illustrates another variant of the production of the pressure $P_s$. A pressure is applied to the pressure chamber 68 which pressure corresponds to the minimum level of pressure $P_s$ during the actuation of the valve. In no phase of the variation of the pressure $P_s$ is there any pressure above atmospheric in the pressure chamber 58. The lever 63, which pivots about the axis 66, causes the tension on cable 60 to relax in the two end positions of the rod 40, and the weight 62 can produce the maximum level of the pressure $P_s$. The drivers affixed to the rod 40 move the lever 63 in the closing and opening directions.

A connection, not shown, that is not free of play between the shut-off member 1 and the rod 40 in the direction of operation also permits lowering the pressure $P_s$ before the movement of the shut-off member begins.

What is claimed is:

1. A seal for a valve comprising a housing with a tubular casing through which a stream of material can flow axially, and a shut-off member movable translationally in the housing between an open position in which said casing is open to flow and a closed position in which flow through said casing is blocked; said seal comprising a movable seat pressed against the shut-off member, and said seat comprising two membranes connected in a pressure tight manner with the housing, said membranes and a support plate disposed between them forming a pressure chamber to which an internal pressure can be applied, and said membranes being arranged substantially parallel to the shut-off member and having annular surfaces of differing size exposed to internal pressure applied to said pressure chamber such that application of pressure to said pressure chamber generates a force on said seat urging said seat in a direction perpendicular to the direction of movement of said shut-off member, and wherein said support plate serves as a radial guide for said membranes.

2. A seal according to claim 1, wherein one of said membranes which faces the shut-off member has an inner diameter which substantially corresponds to the inner diameter of the tubular casing; the other of said membranes has an inner diameter which is larger than the outer diameter of the tubular casing, and said membranes have outer diameters which are substantially equal in size and are larger than the outer diameter of the tubular casing.

3. A seal according to claim 1, wherein one membrane has a curved surface with a radius, and the other membrane is constructed substantially flat.

4. A seal according to claim 1, further comprising a connecting nipple communicated with said pressure chamber through which nipple pressure from an external source can be applied to said pressure chamber; the applied pressure from said external source being greater than the pressure in the tubular casing and greater than the pressure in the valve housing.

5. A seal according to claim 4, wherein said nipple is communicated with said pressure chamber via a pressure channel formed between said casing and a plate is connected to said casing in a pressure tight manner, and via at least one bore in said casing between said pressure channel and said pressure chamber.

6. A seal according to claim 1, wherein when no external pressure is applied to said pressure chamber, one of said membranes which faces said shut-off member is spaced from the support plate, and the other membrane lies flat against the support plate.

7. A seal according to claim 1, wherein one of said membranes which faces said shut-off member, when subjected to a maximum external load from the direction of the shut-off member, lies flat against the support plate.

8. A seal according to claim 1, wherein one of said membranes which has a surface which contacts shut-off member, has a wear-resistant coating on the contact surface.

9. A seal according to claim 1, wherein one of said membranes which faces the shut-off member has an outer diameter which is at least equal to the outer diameter of the tubular casing, the other of said membranes has an outer diameter which is at most equal to the inner diameter of the tubular casing, and said membranes have inner diameters which are substantially equal in size and are smaller than the inner diameter of the tubular casing.

10. A seal according to claim 1, wherein one of said membranes which faces the shut-off member, has an inner diameter which is smaller than the outer diameter of the tubular casing, the other membrane and the support plate have outer diameters which are substantially equal in size, and said other membrane has an inner diameter which is equal in size to the outer diameter of the tubular casing.

11. A seal according to claim 10, wherein said membranes are each connected to the tubular casing, and each of said membranes has a curved surface adjacent its respective connection to said tubular casing.

12. A seal according to claim 10, wherein said one membrane, when not subjected to either pressure in the pressure chamber or an external load, lies flat against the support plate.

13. A seal according to claim 10, wherein said other membrane, when subjected to a maximum external load from the direction of the shut-off member, lies flat against the support plate, and a stop on the support plate is in axial contact with the tubular casing.

14. A seal according to claim 10, wherein said other membrane is provided with an annular reinforcing plate.

15. A seal according to claim 10, wherein said support plate is formed with a raised seat with a surface in contact with the shut-off member, said seat having a wear-resistant coating on its contact surface with the shut-off member.

16. A seal according to claim 15, wherein the support plate is an annular member, and said seat is disposed adjacent the outer diameter of the annular support plate.

17. A seal according to claim 1, wherein one of said membranes which faces the shut-off member, has an inner diameter which is smaller than the outer diameter of the tubular casing, the other membrane and the support plate have outer diameters which are substantially equal in size, and said other membrane has an inner diameter which is equal to the outer diameter of the tubular casing.

18. A seal according to claim 17, wherein said one membrane is connected to said tubular casing and has a curved surface with a radius adjacent its connection to said tubular casing, and the other membrane presents a flat annular surface.

19. A seal according to claim 17, wherein said other membrane, when subjected to a maximum external load from the direction of the shut-off member, lies flat against the support plate.

20. A seal according to claim 1, wherein one of said membranes which faces the shut-off member has an outer diameter which is smaller that the inner diameter of the tubular casing, the other membrane has an outer diameter which is equal to the inner diameter of the tubular casing, and both membranes have inner diameters which are substantially equal in size and are smaller than the inner diameter of the tubular casing.

21. A seal according to claim 20, wherein said one membrane has a flat annular surface, and said other membrane has a curved surface with a radius.

22. A seal according to claim 1, wherein said pressure chamber is connected to a double cylinder, which serves to generate pressure to be applied to said pressure chamber, and wherein the pressure in said pressure chamber is directly proportional to a pressure prevailing in the tubular casing.

23. A seal according to claim 22, wherein pressure of a medium flowing through said tubular casing is transferred to said pressure chamber through an outside pressure medium which is a gas or a liquid at room temperature.

24. A seal according to claim 22, wherein said double cylinder comprises two pistons connected to each other, each piston having a respective piston surface, and the ratio of the pressure in said pressure chamber to the pressure prevailing in said tubular casing is determined by the ratio of the piston surfaces to each other.

25. A seal according to claim 22, wherein a piston of said double cylinder is movably connected through a connecting rod to a lever.

26. A seal according to claim 25, wherein said lever is pivotally mounted about an axis and is coupled with a weight and a cable via rollers and a connecting element to a rod which in turn is connected to the shut-off member.

27. A seal according to claim 26, wherein said rod is movable between two end positions, and when said rod is in one or the other of said end positions, said weight is suspended by a cable and said connecting rod is not acted upon by said weight.

28. A seal according to claim 27, wherein said fastening element is equally spaced from the midpoint of a connecting line between axes of said rollers when said rod is in either of said two end positions.

29. A seal according to claim 1, wherein the seal pressure chamber is connected with a cylinder pressure chamber of a cylinder having a piston which serves to generate pressure to be applied to said seal pressure chamber, the pressure in said cylinder pressure chamber being equal in magnitude to the pressure within said seal pressure chamber, and wherein pressure is applied to said seal pressure chamber through an inert outside medium.

30. A seal according to claim 1, wherein said seal pressure chamber is connected with a cylinder pressure chamber of a cylinder which has a piston and which serves to generate pressure for application to said seal pressure chamber, the pressure in said cylinder pressure chamber being equal in magnitude to the pressure in said seal pressure chamber, wherein pressure is applied to said seal pressure chamber through an inert outside medium and the magnitude of the applied pressure corresponding to the minimum pressure during actuation of a rod connected with the shut-off member.

31. A seal according to claim 30, wherein the connection between the rod and the shut-off member moves in the same direction of movement as the translationally moveable shut-off member.

32. A seal according to claim 30, wherein said piston is connected through a connecting rod to a weight.

33. A seal according to claim 32, wherein said rod is movable between two end positions, and said weight is connected with a fixed tension through a cable and a roller, and is not tensioned in the two end positions of the rod.

34. A seal according to claim 33, wherein a lever, which is pivotally mounted around an axis, is in loose contact with the cable, and wherein in every position of the rod other than the two end positions, the cable through which the weight is connected is tensioned thereby suspending the weight.

35. A seal according to claim 34, wherein said lever is movable by drivers connected to said rod.

36. A seal according to claim 34, wherein respective longitudinal axes of said lever and of said rod define equal angles in both end positions of the rod.

* * * * *